United States Patent [19]

Kumakura

[11] 4,227,105

[45] Oct. 7, 1980

[54] ANNULAR MAGNET ASSEMBLY

[76] Inventor: Shokichi Kumakura, 5-3, Funabori 2 chome, Edogawa-ku, Tokyo, Japan

[21] Appl. No.: 45,503

[22] Filed: Jun. 4, 1979

Related U.S. Application Data

[63] Continuation of Ser. No. 808,218, Jun. 20, 1977, abandoned.

[30] Foreign Application Priority Data

Jun. 21, 1976 [JP] Japan ............................. 51-80400
Jun. 21, 1976 [JP] Japan ............................. 51-80404
Nov. 15, 1976 [JP] Japan ............................ 51-152887

[51] Int. Cl.² ..................................... H02K 21/22
[52] U.S. Cl. .............................. 310/153; 310/70 R; 310/156
[58] Field of Search ............... 310/152, 153, 156, 154, 310/42, 70 R, 67 R, 70 A

[56] References Cited

U.S. PATENT DOCUMENTS

| | | | |
|---|---|---|---|
| 1,792,530 | 2/1931 | Coughlin | 310/153 |
| 2,568,479 | 9/1951 | Armstrong et al. | 310/153 |
| 2,756,356 | 7/1956 | Brownlee et al. | 310/153 |
| 3,250,929 | 5/1966 | Maier | 310/68 |
| 3,368,275 | 2/1968 | Eberline et al. | 310/153 X |
| 3,828,212 | 8/1974 | Harkness et al. | 310/153 |
| 4,012,651 | 3/1977 | Burson | 310/153 |

*Primary Examiner*—Donovan F. Duggan
*Attorney, Agent, or Firm*—Jordan and Hamburg

[57] ABSTRACT

An annular magnet assembly for a dynamoelectric machine includes a plurality of arcuate permanent magnets disposed in an annular array and a frame member of a non-magnetic material for rigidly connecting the magnets together. The magnets are disposed in end-to-end abutment to form the annular array, both ends of each magnet being cut to form a recess in the inner or outer peripheral surface of the annular array at the respective abutments of the magnets. The frame member comprises a pair of annular portions which tightly engage the opposite sides of the annular array and ledge portions extending through the recesses to connect the pair of annular portions together.

7 Claims, 7 Drawing Figures

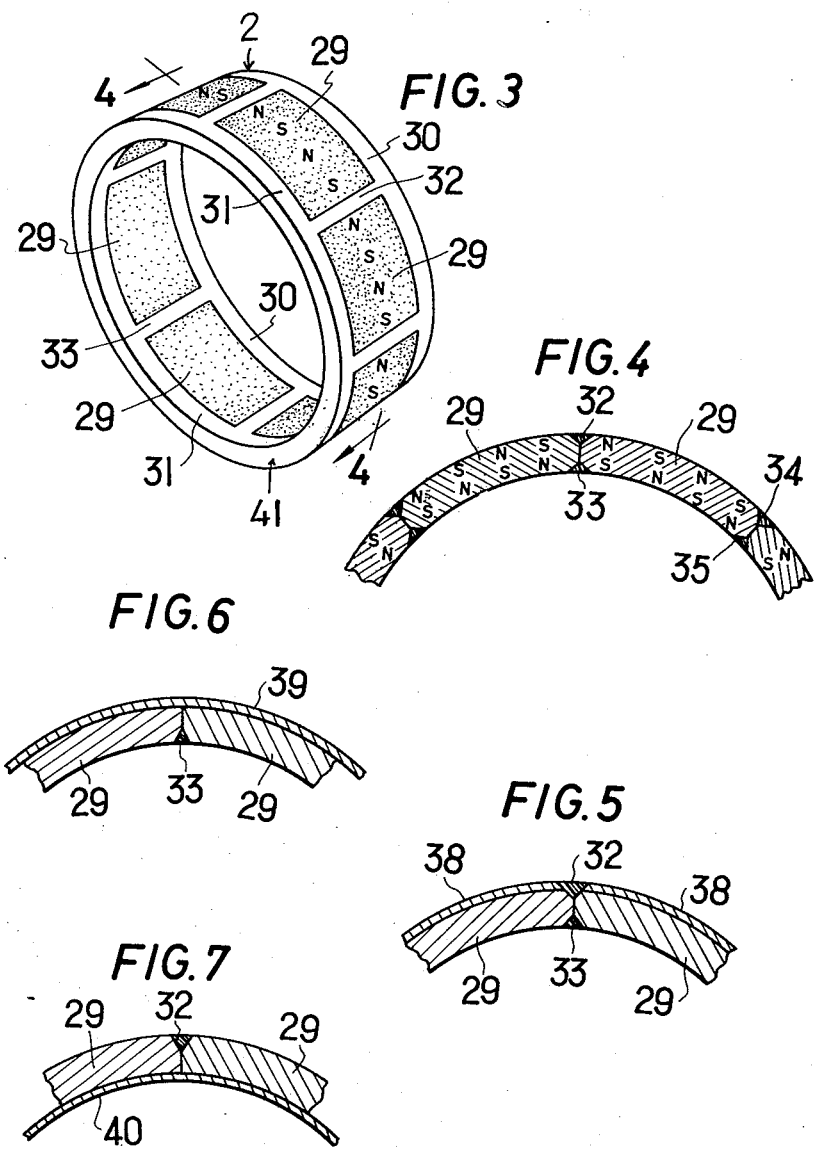

ANNULAR MAGNET ASSEMBLY

This is a continuation of application Ser. No. 808,218, filed June 20, 1977, now abandoned.

FIELD AND BACKGROUND OF THE INVENTION

The invention relates to a dynamoelectric machine including permanent magnets which produce a magnetic field. More particularly, it relates to an annular assembly of a plurality of arcuate permanent magnets disposed in juxtaposition which may be used in such a machine.

Ceramic permanent magnets such as those formed of ferrite can be utilized in a dynamoelectric machine. It is recognized that a ceramic magnet can be magnetized in a radial direction, and has pole faces on itself. A high reluctance is presented along a path extending parallel to the pole faces, so that a need can advantageously be avoided for the provision of angularly spaced pole shoes or pole pieces which are required when ordinary Alnico magnets are used. Because of the difficulty to form a single ring of ceramic magnet which is radially magnetized, it is necessary to utilize a plurality of arcuate ceramic magnets disposed in an annular array in applications such as a dynamoelectric machine.

U.S. Pat. No. 3,663,850 issued to R. E. Phelon on May 16, 1972 discloses the use of an annular array of arcuate magnets in a dynamoelectric machine. In this instance, permanent magnets are initially arranged along the inside of a circular shipping band with a spacing between the ends of adjacent magnets into which elastic spacers or spring members are placed. These members act to exert a compressive pressure against the adjacent ends of the magnets, which are thus tightly held against the circular band to achieve a self-sustaining preassembly. The preassembly thus formed is applied against an annular internal surface of the machine which is of an equal diameter as the band, and the band removed, leaving the annular array of magnets held tightly against the machine surface.

The described arrangement requires the consecutive insertion of spacers or springs into the space between successive pairs of adjacent magnets, and it will be appreciated that the last one to be inserted must be placed by temporarily overcoming the pressures applied by oppositely located magnets and which are exerted by the remaining springs already held in place. To assure a positive self-sustaining effect, the spacers or springs must be of a relatively large size and must be of a material providing durability over a prolonged period. Hence, an increased spacing is required between the magnets, precluding the use of an array of increased number of closely spaced magnets. Since the described arrangement is adapted to be supported against its surrounding surface, the array cannot be mounted on a rotor or stator which is located inwardly thereof.

SUMMARY OF THE INVENTION

It is an object of the invention to provide an annular assembly of a plurality of arcuate permanent magnets which is simple in construction and easy to manufacture while permitting the magnets to be closely juxtaposed.

It is another object of the invention to provide an annular assembly of a plurality of arcuate permanent magnets which has an increased rigidity and which can be applied to either the external surface of a rotor or the internal surface of a stator.

In accordance with the invention, there is provided an annular magnet assembly adapted to be mounted on an annular or cylindrical surface of a dynamoelectric machine for producing a magnetic field therein, comprising a plurality of arcuate permanent magnets disposed in an annular array having a first and a second major surface, the first surface being in engagement with the annular or cylindrical surface of the machine, recesses being formed in the second major surface between adjacent magnets, and a frame member of a nonmagnetic material for rigidly connecting the magnets together, the frame member including a pair of annular portions which tightly engage the opposite sides of the annular array and ledge portions extending through the recesses to connect the pair of annular portions together.

In a preferred embodiment of the invention, the frame member is formed by casting a resin into a mold in which the magnets are properly positioned. The ends of the magnets may be tapered by grinding to form the recesses. The annular array of permanent magnets is radially aligned with the pair of annular portions of the frame member. Each of the permanent magnets is formed of a ceramic material, and a plurality of pole faces are directly formed in the second surface, each pole face including a magnetic pole which is radially magnetized.

The annular magnet assembly of the invention can be modified in a variety of ways depending on the concentric relationship between the rotor and the stator of the dynamoelectric machine to which it is applied. Generally, the assembly can be applied to various types of dynamoelectric machines. Additional recesses similar to those formed in the second major surface may also be formed in the first major surface between the adjacent magnets for passing additional ledge portions of the frame member. The individual magnets of the assembly are radially retained at their ends in a rigid manner by these ledge portions, and are engaged by the pair of annular portions of the frame member at their opposite sides. Instead of providing the additional ledge portions, the first surface of the magnets may be coated with a circular band of a magnetizable material, which serves as a magnetic path between adjacent magnetic poles located in the first major surface, preventing a flux leakage from the magnetic poles to the mounting surface of the machine, which therefore may be formed of a non-magnetic material.

In the annular magnet assembly of the invention, the permanent magnets are disposed in end-to-end relationship with a small recess therebetween, so that the spacing between the two adjacent magnets can be minimized, with consequence that the number of magnetic poles formed can be increased to assure a high efficiency of the machine even at a low number of revolutions.

BRIEF DESCRIPTION OF THE DRAWINGS

FIG. 3 is a perspective view of the assembly shown in FIG. 1 or FIG. 2;

FIG. 4 is a fragmentary cross section taken along the line 4—4 shown in FIG. 3;

FIGS. 5 and 6 are fragmentary cross sections similar to FIG. 4, but illustrating other forms of the assembly which can be used in the generator of FIG. 1; and FIG. 7 is a fragmentary cross section of a further form of the assembly which can be used in the generator of FIG. 2.

DESCRIPTION OF PREFERRED EMBODIMENTS

Figure 1:
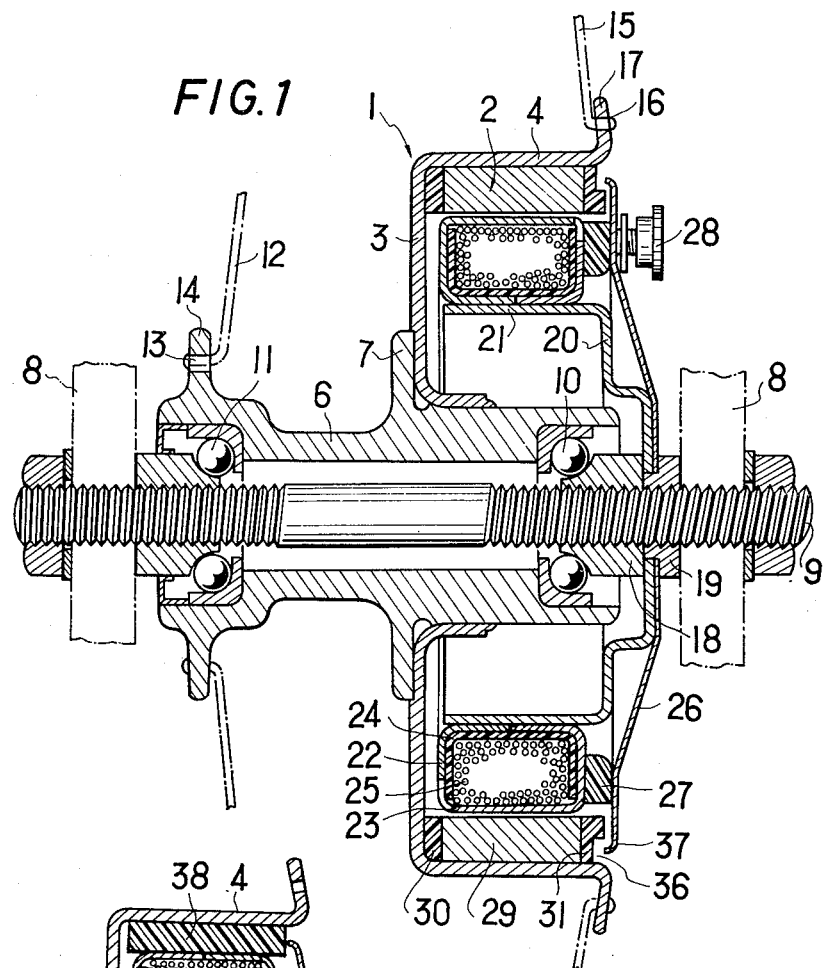
FIG. 1 is a longitudinal sections of a bicycle generator having a rotor on which the annular magnet assembly of the invention is mounted.

Referring to FIG. 1, there is shown a bicycle generator 1 incorporating an annular assembly 2 of arcuate magnets which is constructed in accordance with the invention. A hub wheel of the bicycle is shown at 3 and includes a rim 4, to the annular inner surface of which the assembly 2 is secured as by adhesive bonding. The generator 1 includes a stator 5 which is concentrically disposed within the assembly 2 with a small clearance therebetween.

A hub of the bicycle is shown at 6 and is formed with a mounting flange 7 on which the hub wheel 3 is firmly mounted. The hub 6 is rotatably mounted on an axle 9 by means of a pair of ball bearings 10, 11. The axle 9 is mounted in a frame 8 in a manner known in the art. At its one end, the hub 6 is provided with a flange 14 having openings 13 formed therein, to which one set of spokes 12 are anchored. The other set of spokes 15 are anchored to openings 16 formed in a small flange 17 extending from the end of the rim 4.

The stator 5 is secured, as by adhesive bonding, to the outer surface of an annular rim 21 of a stationary drum 20 which may be formed of a non-magnetic material such as aluminium. The drum 20 is held fixedly between a stationary race 18 of the bearing 10 and a clamping nut 19, both of which threadably engage the axle 9. The construction of the stator 5 is conventional. Briefly, it comprises a pair of complementary core members 22, 23 which form together a hollow annular core and which are formed on its outer periphery with a plurality of interdigitated comb-like pole pieces, and coil assembly 25 including a bobbin 24 which is fitted into the hollow space defined by the core members 22, 23. It is understood that the winding of the coil assembly 25 is in concentric relationship with the core. The pole pieces on the core members 22, 23 are closely spaced from the inner surface of the annular magnet assembly 2.

Referring to FIG. 3, the annular magnet assembly according to the invention comprises an annular array of arcuate permanent magnets 29 disposed in end-to-end abutment, with recesses 34, 35 of a triangular cross section being formed in both the outer and the inner surface of the array between adjacent magnets, and a frame member 41 for rigidly retaining the annular array. The frame member 41 includes a pair of annular portions 30, 31 which tightly engage the opposite sides of the annular array, and ledge portions 32, 33 which extend through the individual recesses 34, 35, respectively, to connect the pair of annular portions 30, 31 together. Each permanent magnet 29 comprises a ceramic materal which is molded in a magnetic field in a known manner so as to be magnetized in the radial direction of the array. On its outer and inner surfaces, the annular array is formed with a plurality of alternate N- and S- poles. The opposite end of the individual magnets 29 are ground to a tapered form to define the recesses. The frame member 41 is formed by casting a resin into a mold in which the annular array of magnets 29 is properly positioned. The pair of annular portions 30, 31 may have a radial dimension which is equal to that of the array. Though the ledge portions 32, 33 are shown as separate elements in the example shown, they may be integrally molded by providing a small clearance between the ends of adjacent magnets.

In the generator 1 shown in FIG. 1, the annular magnet assembly 2 rotates together with the hub wheel 3, and a voltage is induced across the coil assembly 25 on the stator 5 under the influence of the magnetic field produced by the magnets 29. In view of the fact that the hub wheel 3 rotates at a number of revolutions on the order of 120 rpm, it is desirable that the generator has a high magnetic efficiency. At this end, the number of magnetic poles available in the array is increased while at the same time forming the hub wheel 3 inclusive of the rim 4 of a magnetizable material so that the rim 4 serves as a magnetic path of a minimum length between the adjacent magnetic poles, thus reducing the leakage flux.

In the embodiment shown, a sideplate 26 is secured to the drum 20 for preventing any foreign matter from finding its way into the clearance between the assembly 2 and the stator 5. The sideplate 26 has an end 37 which is received in and spaced from a step 36 formed in the annular portion 31 of the assembly 2. A spacer 27 of a non-magnetic material is interposed between the stator and the sideplate 26, which carries terminals 28 (only one being shown) for connection with lead wires of the coil assembly 25 which extend through the spacer 27.

Figure 2:
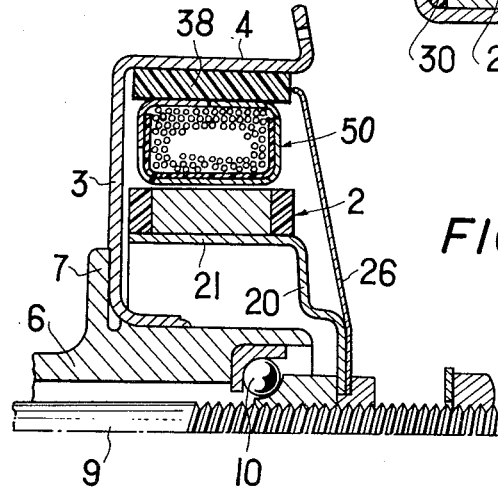
FIG. 2 is a fragmentary section of a similar bicycle generator but having the annular magnet assembly mounted on the stator thereof.

FIG. 2 shows a generator 42 which includes the annular magnet assembly 2 of the invention as applied to the stator thereof. Parts corresponding to those shown in FIG. 1 are designated by like numerals in FIG. 2. The generator 42 includes a rotor 50 comprising an annular core and a coil assembly which are similar to those shown in FIG. 1. The rotor 50 is disposed around the annular inner surface of the rim 4 with a spacer 38 of a non-magnetic material interposed therebetween. The assembly 2 is carried by the rim 21 of the drum, which in this instance, comprises a magnetizable material. The construction of the assembly 2 remains unchanged. It will be understood that such a generator requires the provision of a slip ring assembly for deriving an output from the rotor 50, but the slip ring assembly is not shown for reason of obviousness.

FIG. 5 shows another form of the annular magnet assembly 2. The frame member 41 also includes ledge portions 32, 33. A plate 38 of a magnetizable material is adhesively applied to the outer surface of each magnet 29. When this assembly 2 is used in the generator of FIG. 1, the hub wheel 3 may be formed of a non-magnetic material.

FIG. 6 shows a modified magnet assembly which is similar to that shown in FIG. 3 except that the ledge portions 32 are replaced by an annular band 39 of a magnetizable material, covering the exterior side of the assembly. This may be used in the generator of FIG. 1.

FIG. 7 shows a modification of the arrangement shown in FIG. 6 in that an annular band 40 of a magnetizable material is applied to the interior surface of the assembly. This assembly may be used in the generator of FIG. 2.

The magnet assembly shown in FIG. 6 or FIG. 7 may be manufactured by placing the band 39 or 40 in the mold and disposing an annular array of arcuate magnets 29 along the outer or inner surface of the band before casting a resin into the mold.

What is claimed is:

1. An annular magnet assembly adapted to be mounted on an annular or cylindrical surface of a dynamoelectric machine for producing a magnetic field therein, comprising a plurality of arcuate permanent magnets disposed in an end-to-end abutment to form an annular array, each of the permanent magnets having a first and a second major surface, the first surface being in engagement with the annular or cylindrical surface of the machine, both ends of each permanent magnet being cut to form a recess in the second major surface at the respective abutment of the magnets, said recess being disposed on opposite sides of the respective abutment of the magnets and extending axially across the axial width of said magnets, and a frame member of a non-magnetic material for rigidly connecting the magnets together, the frame member including a pair of annular portions which tightly engage the opposite sides of the annular array and ledge portions disposed in said recesses and extending axially across the width of said magnets to connect the pair of annular portions together and radially retain said magnets in said frame member.

2. An annular magnet assembly according to claim 1, further comprising additional recesses formed in the first surface between the adjacent magnets, and the frame member includes additional ledge portions which extend through the additional recesses to connect the pair of annular portions together.

3. An annular magnet assembly according to claim 1, further comprising an annular band which covers the first surface.

4. An annular magnet assembly according to claim 3 in which the band is of a magnetizable material.

5. An annular magnet assembly according to claim 1 in which the first and the second surface respectively to the outer and the inner surface of the assembly.

6. An annular magnet assembly according to claim 1 in which the first and the second surface respectively to the inner and the outer surface of the assembly.

7. An annular magnet assembly according to claim 2 in which the surface of the magnets which defines the first surface is covered with a plate of a magnetizable material.

* * * * *